United States Patent Office 3,475,194
Patented Oct. 28, 1969

3,475,194
METHOD OF TREATING POLYESTER FILMS
Carlos M. Samour, Wellesley Hills, Mass., assignor, by mesne assignments, to The G. T. Schjeldahl Company, Northfield, Minn., a corporation of Minnesota
No Drawing. Filed Oct. 30, 1964, Ser. No. 407,880
Int. Cl. C09j 7/00; B44d 1/22
U.S. Cl. 117—47                                                                 6 Claims

ABSTRACT OF THE DISCLOSURE

Polyester films or shaped articles when treated with strong sulfuric or chlorosulfonic acid and then quenched in water develop a white, lusterless surface deposit of amorphous polyester substance. This amorphous polyester may be recrystallized by heat or by solvent vapors. By exposing the sulfuric acid treated film briefly to the action of strong nitric acid, the surface of the film develops a luster and the film as a whole has greatly reduced susceptibility to recrystallization by heat or solvent vapors. Films treated in accordance with the present invention may be utilized as a backing to receive a pressure sensitive adhesive along one surface, the adhesive being applied to a surface treated only with strong sulfuric or chlorosulfonic acid, the opposite surface having been exposed to such acids followed by exposure to strong nitric acid in accordance with the invention.

---

This invention relates to a process for treating a shaped article comprising polyester resins. More particularly it relates to methods for effecting the transparency and the heat-sealing characteristics of such articles.

By shaped articles is meant films, foils, ribbons, fibers, yarns, woven or nonwoven fabrics, and the like composed at least in part of a polyester formed from a glycol and phthalic acid. In the case of terephthalic acid, such polyester products are known commercially as Dacron (Du Pont) or Terylene (Imperial Chemical Industries) when in fiber, yarn, or fabric form, and as Mylar (Du Pont) or Melinex (Imperial Chemical Industries) in film form. The materials as met with commercially have a high degree of crystallinity, are molecularly oriented, have a rather abrupt melting point, and are hydrophobic. The surfaces of such articles are difficult to dye or to write on with simple aqueous inks, and are so dense and smooth as to resist the affixing thereto of other materials intended to alter the appearance or function of the surface. The surfaces are not heat-sealable, and resist adherence to many of the common adhesives normally used to promote adhesion to plastic surfaces.

In U.S. patent application Ser. No. 347,781, filed Feb. 27, 1964, now U.S. Patent 3,357,874, said patent being of common assignee with the present application, there is described a process for treating a polyester film with chlorosulfonic acid or with sulfuric acid of about 85% concentration under such conditions as to cause a certain degree of solution of the polymeric substance on the surface of the film for a period of not more than 300 seconds. There is also described a process for arresting the solvent action of the acid by quenching the acid-treated film in water, with the formation of a white opaque deposit of amorphous polyethylene terephthalate which adheres to the surface of the article and which alters the physical and chemical reactivity of said surface.

In contrast to the crystal-clear, high oriented crystalline surface of untreated polyethylene terephthalate film-the surface of a film treated in accordance with the process of U.S. Patent 3,357,874 is chalky, lusterless, and substantially opaque. Physically, the surface is porous and hydrophilic, so that it may be written on with water-based inks, or drawn on with water-color paints, in contrast to an untreated film which is nonreceptive to water, so that ink and water colors tend to draw together thereon in the form of disconnected droplets. A treated surface, due perhaps to its porous spongy nature, may also be readily impregnated with dry pigments such as iron oxide or other coloring matter, with powdered graphite, or with a wide variety of finely divided solid or liquid substances.

An addend applied to a treated surface of this sort, however, is only loosely and temporarily held thereon by virtue of being physically embedded in the spongy pores of the surface. Such an addend may be readily removed by physical means, as by gentle washing with soapy water. A legend written in water-based ink on a treated surface of this sort may readily be smeared and rendered less legible if the surface, after the ink has dried, is merely rubbed gently with a moistened finger.

In U.S. Patent 3,357,874 there is also described a method for recrystallizing the amorphous surface of an acid-treated polyester film by means of a heating process, so that useful laminates may be made therefrom and so that a second substance, held in intimate contact with the amorphous surface during the heating process, is encapsulated into the surface by recrystallization.

In copending U.S. patent application 643,360, filed June 5, 1967, a continuation-in-part of U.S. application Ser. No. 360,093, now abandoned, also of common assignee, there is set forth another method of utilizing the properties of acid-treated polyester film by a process involving the use of the vapors of certain organic solvents which are solvents for amorphous polyesters but non-solvents for said polyesters in crystalline form.

It is with improvements in the art of conducting laminating and encapsulating processes of this sort that the present invention is concerned.

It has been found that if a shaped object of polyethylene terephthalate, previously treated with chlorosulfonic acid or sulfuric acid according to the Process of U.S. Patent 3,357,874, is treated with nitric acid, a substantial alteration is effected in the properties of the article. The characteristic while opacity of the surface is preserved, but the dull, chalky and lusterless aspect is transformed into a smooth lustrous aspect, and the uniformity of appearance is improved. That is, any irregularity or variation in intensity of the opaque deposit formed by the sulfuric acid treatment seems to be smoothed out by a nitric acid treatment. This is an unexpected result in view of the fact that untreated polyethylene terephthalate has been found to be essentially inert to the influence of nitric acid.

Even more unexpected is the change in other properties of the article that are brought about by nitric acid treatment. As set forth in U.S. Patent 3,357,874 and application Ser. No. 643,360, a polyethylene film, for example, properly treated with sulfuric or chlorosulfuric acid is sensitive to heat, to pressure, and to the effect of certain organic solvents, particularly in vapor form. Posttreatment of such a film with nitric acid, however, renders the film, or the portions of it thus treated, essentially indifferent to the effect of heat and of solvent vapors, and substantially decreases the tendency of the film to become transparent or translucent under pressure.

The nitric acid treatment may be carried out by exposing the sulfuric acid-treated film, or selected portions thereof, to the action of aqueous nitric acid or to the action of nitric acid vapor. In the case of aqueous acid treatment, the nitric acid step may be conveniently coupled directly with the sulfuric acid treatment, in a continuous operation, without the necessity for a separate quenching operation and isolation of the chalky, opaque sulfuric acid-treated film. For example, a polyethylene terephthalate film dipped into concentrated sulfuric acid for 10 seconds and then quenched in water or dilute ammonia will develop a lusterless white surface deposit of amorphous polyester, said deposit being rendered transparent by the effect of heat or of certain organic solvent vapors. If, instead, the film is rinsed in 50% nitric acid for about 30 seconds directly after sulfuric acid treatment, the film is found to have a lustrous opaque white surface, said surface being indifferent to the effects of heat or solvent vapors.

It has been found that at room temperature or from 15° C. to 35° C., concentrations of nitric acid much below about 30% are in general ineffective in bringing about the desired transformation in the nature of the film surface, although the use of elevated acid temperatures aids the rate of transformation. A preferred range of acid concentration is from 40% to 55%, at 15° C. to 35° C., with an exposure time of between 15 seconds and 60 seconds. The action of nitric acid vapor is, at room temperature, considerably slower, and several hours may be required for the realization of maximum transformation. Except where articles may conveniently be aged in a nitric acid vapor, therefore, treatment with aqueous nitric acid is the method of choice for continuous processing. Other equivalents of immersion, such as application by spray, or roller coating, etc., will suggest themselves as alternative methods of applying the acid.

The present invention is of particular utility when it is desired to render certain zones or areas in a sulfuric acid-treated polyethylene terephthalate film insensitive to the effects of heat and of solvent vapor which otherwise tend to render the film transparent. In such a case, it is convenient to conduct a two-step process, isolating the sulfuric acid-treated film as an intermediate product. As one illustration, a paste of 50% nitric acid thickened with an inert thickening agent such as finely divided silica may be printed, in any desired pattern, onto a sheet of polyethylene terephthalate film which has been treated with sulfuric acid according to the disclosure of U.S. Patent 3,357,874. After a 30 second reaction time the printed film is rinsed in running water and blotted dry. The nitric acid-treated areas will be found to be prominently glossy and uniformly white against the dull chalky appearance of the rest of the film.

If the film is now impregnated with a finely divided modifying addend such as a powder or pigment, either by a dry method or by immersion in a fluid dispersion, as in the case of an ink or printing paste, or a dye in solution or suspension, and the impregnated film is then heated to 220° F. for a few seconds, a subsequent washing will reveal that the untreated surface of the film bears the impregnant, of powder or pigment or dye, encapsulated into the surface. The areas of the film which had been treated with nitric acid, however, remain glossy white and unaffected.

As an alternative method of confining the action of the nitric acid to localized portions of the surface of the article, a resist such as of paraffin or of other convenient inert material may be applied to selected surface areas. After treatment with nitric acid, the resist may be removed by solvent treatment, leaving the exposed areas of the film in a converted glossy smooth state while the areas which were under the resist are dull, opaque, and are still sensitive to heat and to solvent vapor action.

Whatever method is selected for confining the action of nitric acid to certain portions of the surface of the object, the goal is to render certain portions indifferent to the action of subsequent heat or solvent vapor treatment, while the other portions remain susceptible to recrystallization. The process of recrystallizing susceptible portions of a sulfuric acid-treated polyester film in the presence of a modifying addend by the use of heat is set forth in U.S. Patent 3,357,874, while the conduct of the recrystallization process under the influence of solvent vapors is set forth in application Ser. No. 643,360.

In addition to localized or zonal effects on one face of a sulfuric acid-treated polyethylene terephthalate film, useful results may be realized by treating one whole face of a film which has been treated with sulfuric acid by total immersion so that both faces bear the characteristic dull, chalky deposit of amorphous polyester. The following example will illustrate this type of utility.

EXAMPLE 1

A sheet of polyethylene terephthalate film 0.003 inch thick was immersed in 96% sulfuric acid for a period of five seconds, after which it was quenched in 10% ammonium hydroxide, rinsed with water, and dried. Both surfaces of the dried film were white, chalky, and opaque.

By a kiss-coating operation, one face of the treated film was then treated with 40% aqueous nitric acid for 30 seconds, after which the film was again rinsed and dried. The face of the film which had been treated with nitric acid was white, but was smooth and glossy.

A polymer suitable for use as a pressure-sensitive adhesive was prepared according to Example 12 of U.S. Patent No. 3,299,010 by the present inventor. The adhesive polymer was prepared from 1 mole equivalent of ethylacrylate, 4 moles of 2-ethylhexyl acrylate, and 1 mole of a mixture of t-alkyl maleamic acids. This mixture of t-alkyl maleamic acids was prepared by reacting maleic anhydride with a mixture of alkyl amines marketed by Rohm & Haas as Primene 81–R.

A 20% solution of this adhesive polymer in methyl ethyl ketone was then spread onto the face of the film which had been treated with sulfuric acid but not with nitric acid. As the solution was spread, the chalky opacity of the sulfuric acid-treated surface was seen to disappear, being replaced by a translucence, while the glossy white lower face of the film, which had received the additional nitric acid treatment, remained unaffected. The bond between the pressure-sensitive adhesive and the film surface was excellent, and the result was a useful pressure-sensitive adhesive tape on a polyethylene terephthalate base, the base being pigmented with finely-divided polyethylene terephthalate in amorphous form. Unlike tapes made from polyethylene terephthalate film which has had only a sulfuric acid treatment, however, the opaque white pigmentation in the tapes of this invention does not become transparent under the influence of heat or of organic solvent vapors. Such tapes are of considerable utility in arts where it is desirable that an applied tape be visible and readily identified.

The exact mechanism by which nitric acid thus transforms the surface of a sulfuric acid-treated polyethylene terephthalate film is not known to me. It has been observed that during the nitric acid treatment, the surface of the film becomes somewhat sticky, as if gelatinized, and will adhere to itself if folded over. There is also a modest degree of swelling in the film. It may be, therefore, that nitric acid has a swelling or plasticizing effect on the deposit of white, amorphous polyester, and that the amorphous material at the surface tends to recrystallize from the swollen state while leaving an underlying layer of opaque material buried beneath a glossy film surface of crystalline polyester.

Whatever the underlying mechanism, the process of this invention provides a simple and inexpensive means for usefully transforming the properties of sulfuric acid-treated shaped articles comprising polyethylene terephthalate, and of increasing and enhancing their utility.

Having thus described my invention, I claim:

1. A process for modifying at least one of the surfaces of a shaped article composed at least in part of crystalline polyethylene terephthalate which comprises exposing said surface for a period of time about 5 seconds to the action of an acid chosen from the class consisting of chlorosulfonic acid and sulfuric acid, said acid being of a concentration of at least about 85%, and subsequently exposing at least a portion of said acid exposed surface to the action of nitric acid of between 30% and 55% concentration for a period of between 15 seconds and 60 seconds.

2. A process for modifying selected portions of at least one surface of a shaped article composed at least in part of crystalline polyethylene terephthalate which comprises exposing said surface for a period of between about 5 seconds and 300 seconds to the action of an acid chosen from the class consisting of chlorosulfonic acid and sulfuric acid, said acid being of a concentration of at least about 85%, arresting the action of said acid by quenching the surface-treated article in an aqueous medium, whereby a white opaque deposit of amorphous polyester is formed on said surface, and exposing said selected portions of the treated surface to the action of nitric acid of between 30% and 55% concentration for a period of between 15 seconds and 60 seconds.

3. The process for incorporating a modifying addend into portions of the surface of a shaped article composed at least in part of crystalline polyethylene terephthalate which comprises exposing said surface for a period of between about 5 seconds and 300 seconds to the action of an acid chosen from the class consisting of sulfuric acid and chlorosulfonic acid, said acid being of a concentration of at least about 85%, arresting the action of said acid by quenching the surface-treated article in an aqueous medium, whereby a white opaque deposit of amorphous polyester is formed on said surface, exposing selected areas of the thus-treated surface to the action of nitric acid of between 30% and 55% concentration for a period of between 15 seconds and 60 seconds, impregnating the surface of said article with a modifying addend, and recrystallizing the impregnated amorphous surface of said shaped article.

4. The process according to claim 3 in which said recrystallization is effected by heat.

5. The process according to claim 3 in which said recrystallization is effected by the action of organic solvent vapors which are a solvent for the amorphous polyester but a nonsolvent for crystalline polyester.

6. The process for producing a readily visible pressure-sensitive adhesive tape on an opaque polyethylene terephthalate base which comprises exposing the opposed major surfaces of a polyethylene terephthalate film for a period of between about 5 seconds and 300 seconds to the action of an acid chosen from the class of sulfuric acid and chlorosulfonic acid, said acid being of a concentration of at least about 85%, arresting the action of said acid by quenching the surface-treated film in an aqueous medium, whereby a white opaque deposit of amorphous polyethylene terephthalate is formed on said opposed major surfaces, exposing one of said major surfaces to the action of nitric acid of between 30% and 55% concentration for a period of between 15 seconds and 60 seconds, and coating the other of said major surface with a pressure-sensitive adhesive dissolved in an organic solvent, said organic solvent being a solvent for the amorphous polyester but a nonsolvent for crystalline polyester.

References Cited
UNITED STATES PATENTS

| | | | |
|---|---|---|---|
| 2,400,720 | 5/1946 | Staudinger et al. | 117—118 |
| 2,666,693 | 1/1954 | Meretey | 156—2 |
| 2,849,359 | 8/1958 | Smith | 156—308 |
| 3,142,582 | 7/1964 | Koretzky et al. | 117—47 |
| 3,186,883 | 6/1965 | Frantzen | 156—7 |
| 3,235,426 | 2/1966 | Bruner | 156—2 |
| 3,251,809 | 5/1966 | Lockwood et al. | 260—75 |
| 3,357,874 | 12/1967 | Kennedy | 117—138.8 |

WILLIAM D. MARTIN, Primary Examiner

B. PIANALTO, Assistant Examiner

U.S. Cl. X.R.

117—118, 122, 138.8; 156—3